United States Patent [19]
Ohtomo et al.

[11] Patent Number: 5,822,050
[45] Date of Patent: Oct. 13, 1998

[54] DIRECTION FINDING SYSTEM

[75] Inventors: Fumio Ohtomo; Yoshikatu Tokuda; Kenichiro Yoshino, all of Tokyo, Japan

[73] Assignee: Kabushiki Kaisha Topcon, Tokyo, Japan

[21] Appl. No.: 649,878

[22] Filed: May 13, 1996

[30] Foreign Application Priority Data

May 13, 1995 [JP] Japan .................................... 7-138803

[51] Int. Cl.⁶ .................................................. G01B 11/26
[52] U.S. Cl. ................. 356/138; 356/139.03; 356/141.3; 356/153
[58] Field of Search ........................... 356/139.03, 141.3, 356/141.5, 150, 153, 138

[56] References Cited

U.S. PATENT DOCUMENTS

| 3,981,587 | 9/1976 | Gievers ................................. 356/141.3 |
| 5,035,503 | 7/1991 | Sadeh et al. ......................... 356/141.3 |
| 5,090,803 | 2/1992 | Ames et al. ......................... 356/139.03 |
| 5,596,403 | 1/1997 | Schiff et al. ........................ 356/139.03 |

FOREIGN PATENT DOCUMENTS

WO 84/04960  12/1984  Germany ................................. 356/153
39609        2/1991   Japan ...................................... 356/153

Primary Examiner—Frank G. Font
Assistant Examiner—Zandra V. Smith
Attorney, Agent, or Firm—Baker & Botts, L.L.P.

[57] ABSTRACT

The present invention provides a direction finding system capable of positioning directions at two points, and particularly, for shifting a ground central base line and a reference point for tunneling work or the like to an underground tunnel shaft or the like, to position a digging thrust direction. A polarized light radiating device irradiates a body for the direction finding system with a polarized light beam or ray bundle and a direction difference detecting device provided within the body receives therein the polarized light beam emitted from the polarized light radiating device and detects the difference between the direction of the polarized light beam and a predetermined direction. A rotatory polarizing plate of the direction difference detecting device allows the polarized light beam to pass therethrough and a condenser lens gathers the polarized light beam transmitted through the rotatory polarizing plate. A light-receiving portion receives therein the polarized light beam gathered by the condenser lens and an encoder device detects a predetermined position and rotation of the rotatory polarizing plate.

6 Claims, 10 Drawing Sheets

GUIDE LIGHT

1400

COLLIMATION DIRECTION 2221
2220
2211
2222

DIRECTION FINDING SYSTEM

BACKGROUND OF THE INVENTION

1. Field of the Invention

The present invention relates to a direction finding system capable of positioning directions at two points, and particularly to a direction finding system for shifting a ground central base line and a reference point for tunneling work or the like to an underground tunnel shaft or the like thereby to position a digging thrust direction.

2. Description of the Related Art

The positioning of directions at two points conventionally needs to position upward and downward directions corresponding to the direction horizontal to the ground and the direction vertical to the ground.

The positioning of the direction horizontal to the ground can be easily carried out on the ground by a surveying device such as a theodolite or the like. On the other hand, there was nothing for the positioning of the upward and downward directions corresponding to the direction vertical to the ground but to use a conventional special instrument.

Namely, the positioning of the direction in which the underground and the ground are linked to each other, has been practiced by moving two upper and lower points in parallel.

Since a tunnel requiring the positioning of upward and downward directions is dug and thrust in accordance with a specific route upon surveying the tunnel, for example, high precision is required. It is so difficult to perform tunnel correcting work after its digging thrust upon tunneling work in particular. It is necessary for an operator to defensively survey the tunnel.

Namely, a first operation for surveying the tunnel is started from a ground survey. Prior to execution of the tunnel, a central line survey and a cross-sectional survey are executed so that the direction and cross level of the tunnel are determined.

Next, a second operation for surveying the tunnel is of a survey for introducing the ground survey into the underground thereby to determine a central line and a level position of a shaft.

Further, a third operation for surveying the tunnel is of an operation for providing a reference point and a central line of the tunnel to be dug.

A fourth operation for surveying the tunnel is of a surveying operation for matching a digging thrust direction incident to the digging working of the tunnel with a route set to the ground.

In the aforementioned first through fourth operations for surveying the tunnel, a relatively new surveying method using a laser surveying device or the like is now effected in regard to the thrust direction on the ground or in the tunnel. However, a surveying method using such plumb bobs as shown in FIG. 11 has been adopted for the surveying of a shaft, for allowing the ground survey route to coincide with the digging thrust direction of the tunnel.

According to the surveying method using the plumb bobs shown in FIG. 11, two wires 9210 and 9220 are put down within the shaft from a ground support member 9100. Plumb bobs or weights 9310 and 9320 respectively attached to the leading ends of the two wires 9210 and 9220 are inserted into their corresponding damping arrangements 9410 and 9420 using the viscosity of oil or the like. Thus, a first transit 9500 disposed on the ground puts down a survey route and a reference point measured on the ground into a tunnel and sets a digging direction and a reference point of the tunnel.

Namely, the digging direction of the tunnel can be positioned or determined by a second transit 9600 placed within the tunnel through the two wires 9210 and 9220, on the basis of a collimation direction based on the ground direction set by the first transit 9500. For example, the reference point can be determined by the wire 9210 and the digging direction of the tunnel can be defined by the wire 9220.

Incidentally, each of the two wires 9210 and 9220 are not necessarily limited to a thin wires. A piano wire and the like are used for the wires.

Since the surveying is practiced within the shaft, a base or reference line is short and surveying accuracy is reduced even in the case of slight swings. Therefore, in order to prevent the two wires 9210 and 9220 from swinging, the weights 9310 and 9320 respectively attached to the leading ends of the two wires 9210 and 9220 are inserted into their corresponding damping arrangements 9410 and 9420 so as to damp the swings of the two wires 9210 and 9220.

In the surveying method using the plumb bobs, which has been constructed as described above, the two wires 9210 and 9220 are placed in their corresponding approximate positions and the first transit 9500 matches the directions of the two wires 9210 and 9220 with each other based on the ground survey.

Next, the second transit 9600 observes the two wires 9210 and 9220 after the damping of the swings of the two wires 9210 and the 9220 thereby making it possible to determine the reference point and the digging direction of the tunnel.

However, the surveying method using the aforementioned plumb bobs is accompanied by a serious problem that since a large-scaled device is necessary and the transfer of a survey from the ground to the shaft or from the shaft to the underground is repeated, errors become large due to their cumulation.

Further, a problem arises that in order to improve the accuracy of measurement of the tunnel, the span of each plumb bob is in need of an increase and the diameter of the shaft must be increased.

SUMMARY OF THE INVENTION

In one aspect of the present invention, there is thus provided a direction finding system comprising polarized light radiating means for radiating a body of the direction finding system with a polarized light beam, direction difference detecting means provided within the body, for receiving therein the polarized light beam emitted from the polarized light radiating means and detecting the difference between the direction of the polarized light beam and a predetermined direction, a rotatory polarizing plate provided in the direction difference detecting means, for allowing the polarized light beam to pass therethrough, a condenser lens for gathering the polarized light beam transmitted through the rotatory polarizing plate, a light-receiving portion for receiving therein the polarized light beam gathered by the condenser lens, and encoder means for detecting a predetermined position and rotation of the rotatory polarizing plate.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The present invention will now be described with reference to the accompanying drawings wherein.

DETAILED DESCRIPTION OF THE PREFERRED EMBODIMENTS

Preferred embodiments of the present invention will hereinafter be described with reference to the accompanying drawings.

[First Embodiment]

Figure 1:
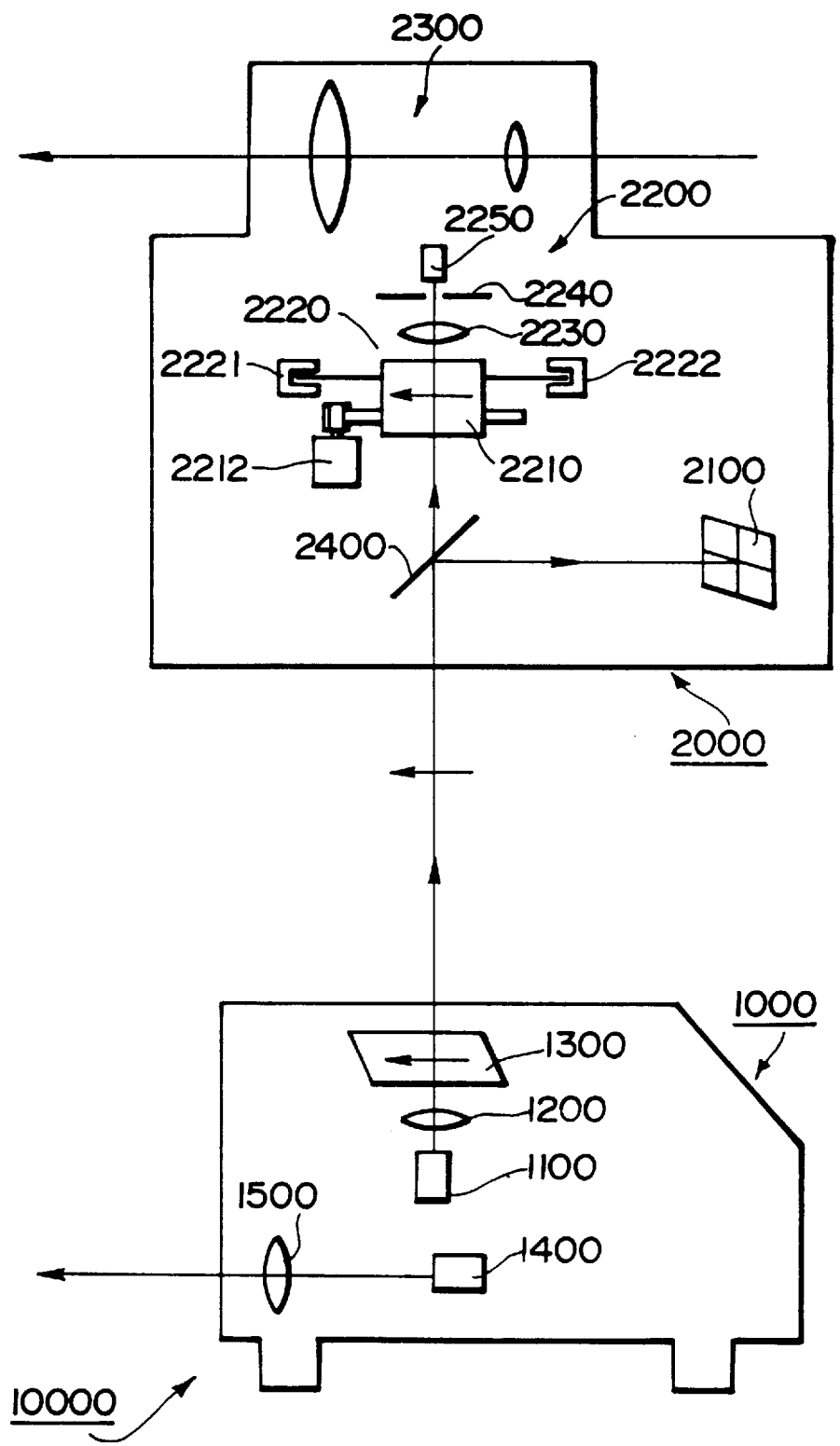
FIG. 1 is a view for describing a first embodiment of the present invention.

FIG. 1 shows a direction finding system 10000 according to a first embodiment of the present invention. The direction finding system 10000 comprises a guide light device 1000 and a body 2000 of the direction finding system 10000. The body 2000 is equipped with a surveying device such as a theodolite, a transit or the like.

The guide light device 1000 corresponds to a guide light means for radiating the body 2000 with polarized light for detecting a direction. The guide light device 1000 comprises a first laser beam source 1100, a first collimator lens 1200, a polarizing plate 1300, a second laser beam source 1400 and a second collimator lens 1500.

The first laser beam source 1100, the first collimator lens 1200 and the polarizing plate 1300 correspond to a polarized-light radiating means. The second laser beam source 1400 and the second collimator lens 1500 correspond to a laser guide forming device for emitting a laser beam in the horizontal direction.

The first laser beam source 1100 is of a light source for vertical light. After a laser beam emitted from the first laser beam source 1100 has been collimated by the first collimator lens 1200, the so-processed laser beam is brought into a polarized light beam or ray bundle by the polarizing plate 1300, followed by application in the upward direction as the vertical light.

The upwardly-applied polarized light beam is adjusted by a suitable inclination correcting mechanism so as to be accurately applied in the vertical upward direction. Further, the optical axis of the polarized ray bundle applied in the vertical upward direction is caused to coincide with the central axis of the inclination correcting mechanism for adjusting the direction of application of the ray bundle or light beam so that no difference is developed therebetween.

The second laser beam source 1400 is of a light source used for the laser guide forming device. After a laser beam emitted from the second laser beam source 1400 has been collimated by the second collimator lens 1500, the so-processed laser beam is applied in the horizontal direction as laser guide light.

Figure 2A:
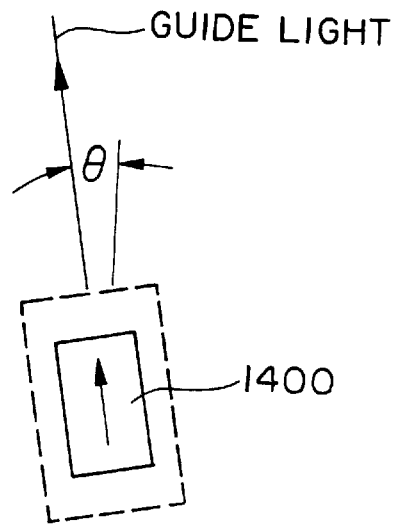
FIG. 2(a) is a view for describing guide light and the polarizing direction of a polarizing plate.

In the guide light device 1000 employed in the first embodiment, the polarizing direction of the vertical light transmitted through the polarizing plate 1300 is set so as to match with the direction of the guide light applied through the second collimator lens 1500 as shown in FIG. 2(a). Incidentally, the polarizing direction is not necessarily limited to or by the direction of the guide light. The polarizing direction may be defined as a specific direction.

The body 2000 comprises a position detecting means 2100, a direction or deflection difference detecting means 2200, a telescope means 2300 and a half mirror 2400. The position detecting means 2100 is used to detect a deviation or displacement of the polarized light beam and the telescope means 2300 functions as a surveying device.

The position detecting means 2100 is used to detect a displacement between the optical axis of the polarized ray bundle emitted from the guide light device 1000 in the vertical upward direction and the center of rotation of the surveying device composed of the telescope means 2300 or the like in the body 2000. If the optical axis of the polarized ray bundle deviates from the center of rotation of the surveying device, then a vibration or deflection occurs in the polarized light incident on the direction difference detecting means 2200, thereby leading to errors in the detection of direction. Photodiodes divided into four elements are used as the position detecting means 2100 employed in the first embodiment. If the displacement between the optical axis of the polarized ray bundle transmitted in the vertical upward direction and the center of rotation of the surveying device can be detected, any sensor may be adopted.

A signal outputted from the position detecting means 2100 is displayed on a suitable display so that the optical axis can be manually or automatically aligned with the center of rotation.

The deflection difference detecting means 2200 is composed of a rotatory polarizing portion 2210, an encoder 2220, a condenser lens 2230, a stop or diaphragm 2240 and a light-receiving portion 2250.

The rotatory polarizing portion 2210 rotates a rotatory polarizing plate 2211 using a motor 2212. The rotatory polarizing portion 2210 is provided with the encoder 2220, which is capable of detecting an angle corresponding to a displacement between a collimation direction of the telescope means 2300 and a laser guide direction of the guide light device 1000 from the reference position set to the encoder 2220, which has a predetermined bearing on the collimation direction of the telescope means 2300.

Incidentally, any types of encoders such as an incremental encoder, an absolute encoder, etc. may be used as the encoder 2220 if the reference position can be set and the angle of rotation as viewed from the reference position can be obtained. In the present embodiment, the incremental encoder provided with an index for indicating the reference position is adopted.

The condenser lens 2230 is used to focus a ray bundle or light beam transmitted through the rotatory polarizing portion 2210 onto the light-receiving portion 2250. The stop 2240 is used to cut unnecessary light such as scattered light, disturbance light, etc.

The light-receiving portion 2250 is used to photoelectrically convert the light transmitted through the rotary polarizing portion 2210 into an electrical signal. A photodiode or the like is used as the light-receiving portion 2250.

The body 2000 constructed as described above separates the polarized ray bundle vertically and upwardly applied from the guide light device 1000 into two parts through the half mirror 2400 and introduces one part thereof into the position detecting means 2100 and allows the other part, i.e., the ray bundle transmitted through the half mirror 2400 to enter into the rotary polarizing portion 2210.

The relationship between the collimation direction of the telescope means 2300 and the direction of the reference position of the encoder 2220 will now be described based on FIG. 2(b) and FIGS. 3(a) and 3(b). FIGS. 3(a) and 3(b) respectively show the manner in which the collimation direction of the body 2000 properly coincides with the direction of the laser guide light emitted from the guide light device 1000. On the other hand, FIGS. 2(a) and 2(b) respectively illustrate the manner in which an angle corresponding to a displacement, i.e., an angular displacement θ is formed between the collimation direction of the body 2000 and the direction of the laser guide light emitted from the guide light device 1000.

Figure 2B:
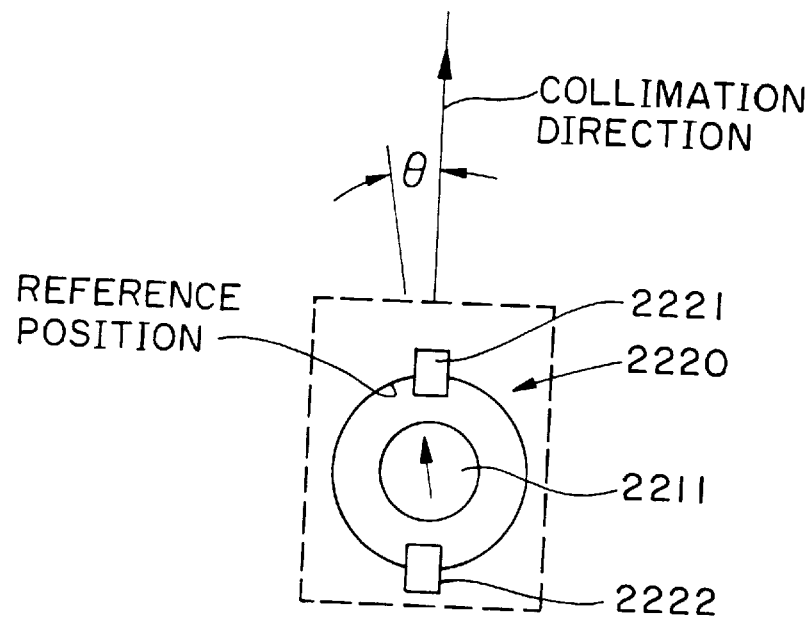
FIG. 2(b) is a view for describing a reference position and the polarizing direction of a rotatable polarizing plate.
Figure 3A:
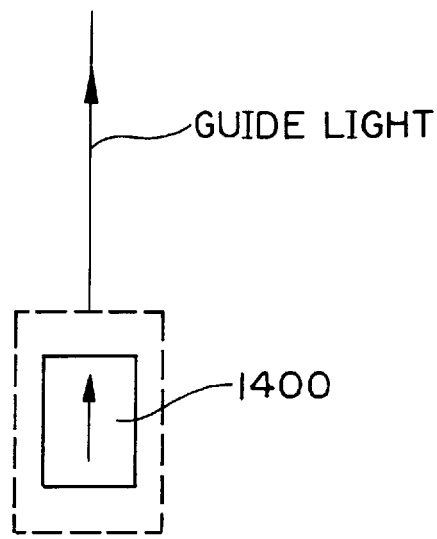
FIG. 3(a) is a view for explaining the guide light and the polarizing direction of the polarizing plate.
Figure 3B:
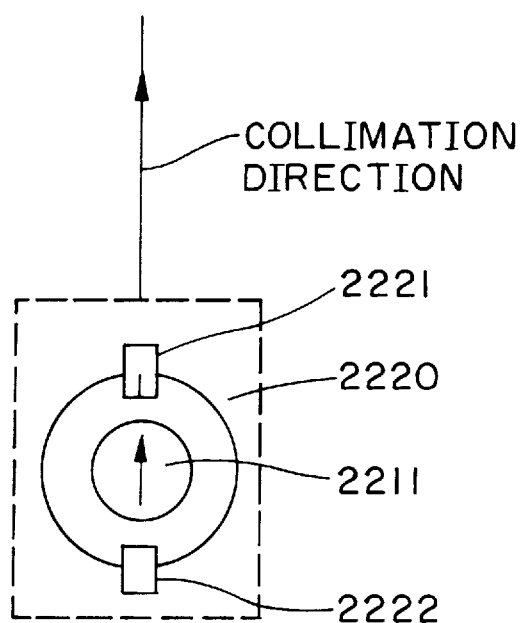
FIG. 3(b) is a view for describing the reference position and the polarizing direction of the rotatable polarizing plate.

As shown in FIG. 2(b), the polarizing direction of the rotatory polarizing plate 2211 of the rotatory polarizing portion 2210 is set to the direction similar to that of the reference position of the encoder 2220. A first photosensor 2221 for detecting the reference position is disposed in the direction in which the collimation direction of the telescope means 2300 coincides with the direction of the reference position of the encoder 2220. It is not always necessary to align the position of provision of the first photosensor 2221 with the collimation direction. The position of its provision may be set to a predetermined angle as viewed from the collimation direction.

Thus, when polarizing direction of the rotatory polarizing plate 2211 is aligned with the collimation direction of the telescope means 2300 as shown in FIG. 3(b), a reference position signal can be obtained from the first photosensor 2221.

Further, if the direction of the guide light emitted from the guide light device 1000 coincides with the collimation direction of the body 2000, then the maximum quantity of light is detected by the light-receiving portion 2250 upon generation of the reference position signal.

Although the direction of the index is also coincident with the collimation direction in FIGS. 3(a) and 3(b), the index may be set in such a manner that an output in which the collimation direction and the polarizing direction of the rotatory polarizing plate 2211 coincide with each other is produced. If the coincidence between the polarizing direction of the polarized-light radiating means and the polarizing direction of the rotatory polarizing plate 2211 can be detected, a predetermined setting may be basically made to the body 2000 so that the direction of the laser guide light of the guide light device 1000 has a predetermined bearing on the collimation direction.

Figure 4:
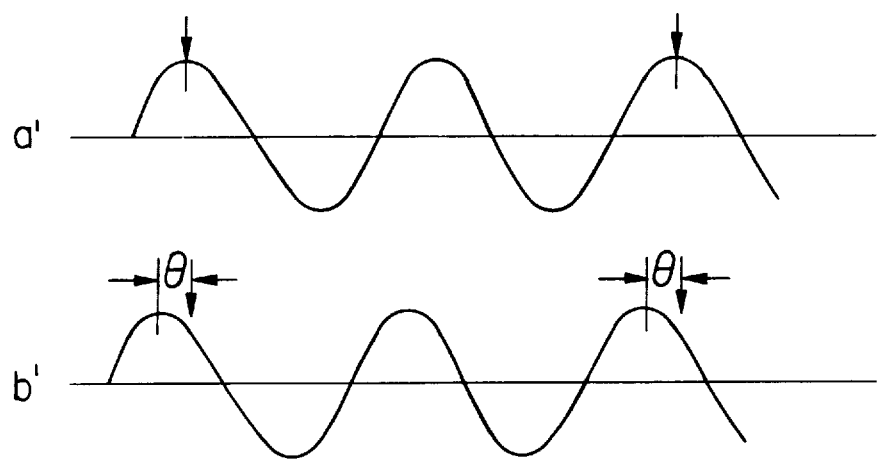
FIG. 4 is a view for explaining a waveform output from a light-receiving portion 2250.

When the light-receiving portion 2250 photoelectrically converts the light transmitted through the rotatory polarizing portion 2210 into an electrical signal, a sine wave is developed as indicated by a' in FIG. 4. Namely, when the polarizing direction (corresponding to the direction of the guide light) of the polarizing plate 1400 of the guide light device 1000 and the polarizing direction of the rotatory polarizing plate 2211 of the body 2000 matches with each other, the peak of the sine wave coincides with a signal indicative of a reference position indicated by arrow.

When "an angle of displacement or angular displacement θ" is formed between the collimation direction of the telescope means 2300 and the polarizing direction of the rotatory polarizing plate 2211 as shown in FIGS. 2(a) and 2(b), a waveform outputted from the light-receiving portion 2250 is generated as indicated by b" in FIG. 4. The "angular displacement θ" can be measured by detecting the difference in phase between the sine wave and the reference position signal.

Figure 5:
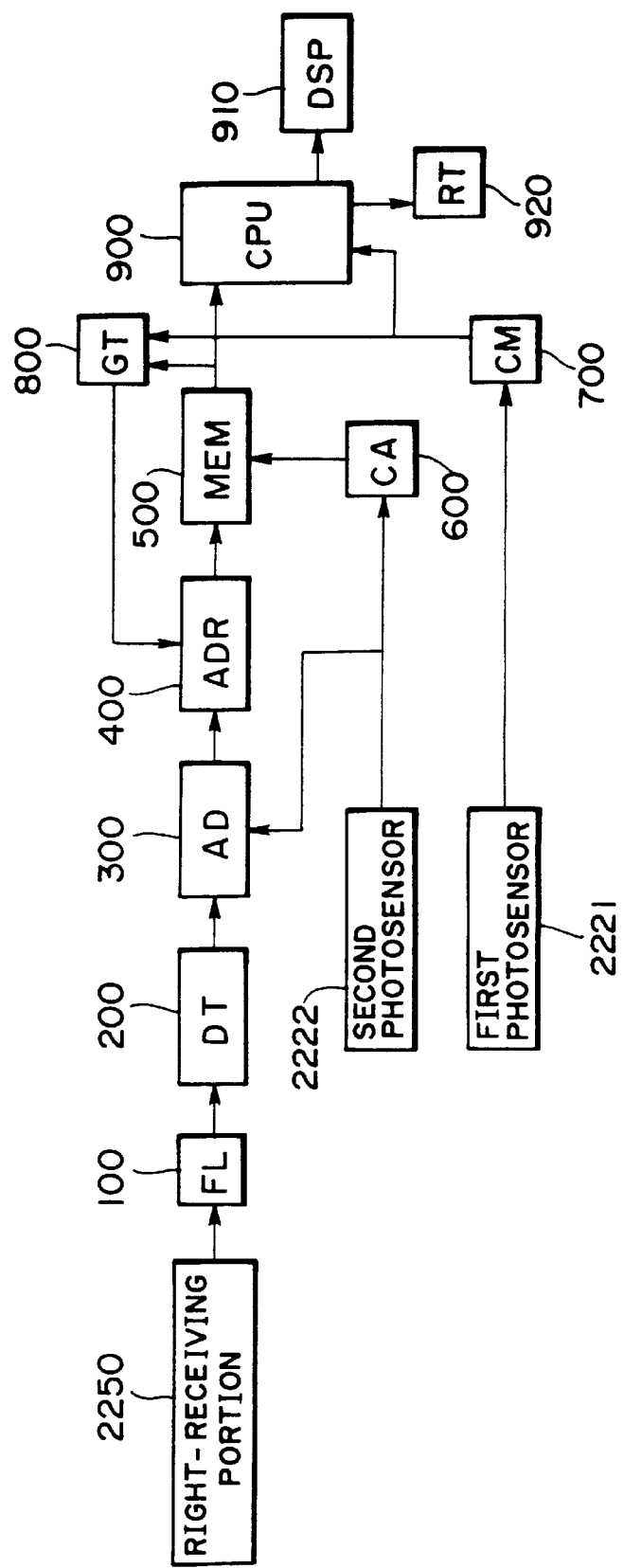
FIG. 5 is a view for describing an electrical configuration.

The measurement of the phase difference between the waveforms output from the light-receiving portion 2250 will now be described in detail with reference to FIG. 5.

An electrical configuration of the direction difference detecting means 2200 comprises the light-receiving portion 2250, a filter 100, a detector 200, an A/D converter 300, an adder 400, a memory 500, an address counter 600, a number-of-revolutions counter 700, a gate 800, a CPU 900, a display 910, and a remote controller 920.

Incidentally, an electrical circuit including the CPU 900 corresponds to a control means.

The filter 100 is of a filter in which a central frequency is included in a modulation frequency of the first laser beam source 1100, which is used to reduce noise components of a signal sent from the light-receiving portion 2250.

The envelope of a signal transmitted through the filter 100 is detected by the detector 200. The detected envelope is of a phenomenon developed by the rotation of the rotatory polarizing plate 2211. A signal outputted from the detector 200 is given as a waveform indicated by c in FIG. 6. As is apparent from a polarization characteristic, the output signal of the detector 200 is given as two waveforms each time the rotatory polarizing plate 2211 is rotated once. Incidentally, the output waveform becomes a waveform including noise, which varies due to noise generated in an electric system, rotational variations, ununiformity of the polarization characteristic of the rotatory polarizing plate 2211, a variation in signal incident to an axial change, etc.

Figure 6:
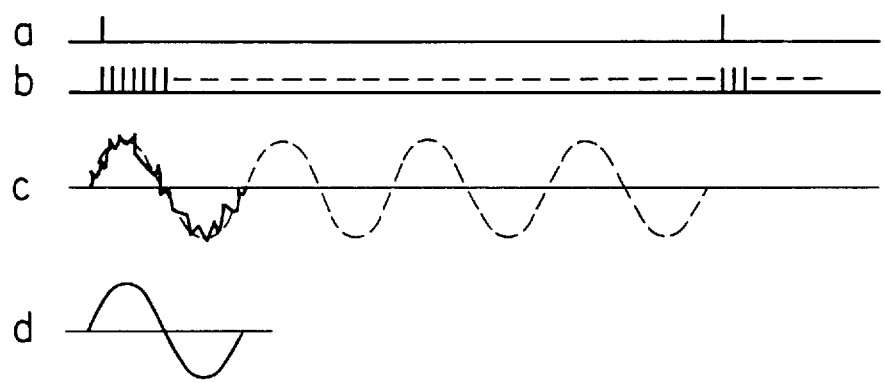
FIG. 6 is a view for describing the result of computation.

(a) in FIG. 6 shows a signal outputted from the first photosensor 2221 for detecting an index indicative of a reference position. (b) in FIG. 6 illustrates a signal outputted from a second photosensor 2222 for detecting a count for angular detection, which is indicative of an angle as viewed from the reference position.

The signal outputted from the second photosensor 2222 is supplied to the A/D converter 300 and the address counter 600.

The signal outputted from the detector 200 is A/D-converted into a digital signal by the A/D converter 300 based on the signal outputted from the second photosensor 2222, followed by delivery to the adder 400.

The adder 400 adds the output of the memory 500 and the output of the A/D converter 300, followed by supply to the memory 500. This additive operation is of a cumulative computation for performing "superposition averaging".

The relationship between the rotation of the encoder 2220 and the address counter 600 is as follows: When the number of pulses obtained from the second photosensor 2222 is N for each rotation of the encoder 2220, the address counter 600 is configured as a base N/2 number counter. Therefore, the address counter 600 obtains access to the same address in the memory 500 for each period of a signal wave.

The signal outputted from the first photosensor 2221 is sent to the number-of-revolutions counter 700. When the contents of the number-of-revolutions counter 700 are 0, the counter-of-revolutions counter 700 puts the gate 800 into a prohibited state so that the contents of the memory 500 are not input to the adder 400.

Namely, the output signal of the A/D converter 300 with respect to the first rotation of the encoder 2220 is stored in the memory 500 accessed by the address counter 600 as it is. The output signal of the A/D converter 300 is added to the contents of the memory 500 from the second rotation of the encoder 2220. Accordingly, the additive operation of the adder 400 subsequent to the second rotation is equivalent to the cumulative computation for performing "superposition averaging".

When the number-of-revolutions counter 700 reaches a predetermined number of times, it is reset to 0. Since the initial one period at the time of 0 of the number-of-revolutions counter 700 means that the output produced from the memory 500 corresponds to the result of cumulation of the predetermined number of times, the CPU 900 reads the contents of the address counter 600 and the contents of the memory 500 by one period when the number-of-revolutions counter 700 has reached 0. The result of computation subjected to the "superposition averaging" operation is represented as indicated by (d) in FIG. 6. Incidentally, the axis of abscissas indicates an address and the axis of ordinates indicates a data value.

Further, the CPU 900 effects Fourier transformation on the read data to extract sin and cos components of a signal. If the sin and cos components are respectively defined as Ds and Dc, then a phase φ of a reference direction detection signal (corresponding to the output signal of the first photosensor 2221) can be determined as follows:

$$\phi = \tan^{-1}(Ds/Dc)$$

Thus, if the direction of the reference position of the encoder 2220 and the collimation direction of the telescope means 2300 are set to a predetermined relation, then the phase φ can be associated with the "angular displacement θ" formed between the collimation direction of the telescope means 2300 and the direction of the guide light from the guide light device 1000.

In the first embodiment, θ=φ/2 from the viewpoint of the polarization characteristic. Therefore, the CPU 900 computes the "angular displacement θ" from the relation in θ=φ/2 and allows the display 910 to display the result of computation thereon.

By superimposedly averaging signals obtained from the rotatory polarizing plate 2211, a sine wave, which provides less distortion, can be obtained so that a high phase higher in accuracy can be determined.

Further, the CPU 900 sends moving-direction information required to set the "angular displacement θ" to 0 to the guide light device 1000 through the remote controller 920 so that the guide light device 1000 adjusts the direction of the guide light. Thus, when the CPU 900 confirms that φ=0, the CPU 900 deactivates the remote controller 920.

The first embodiment constructed as described above makes it possible to match the collimation direction of the telescope means 2300 with the direction of the guide light applied from the guide light device 1000.

Thus, if the telescope means 2300 is collimated on the ground and the collimation direction thereof is defined, then the guide light can be applied in the same direction as the ground collimation direction even on the underground, so that the positioning can be achieved.

[Second Embodiment]

Figure 7:
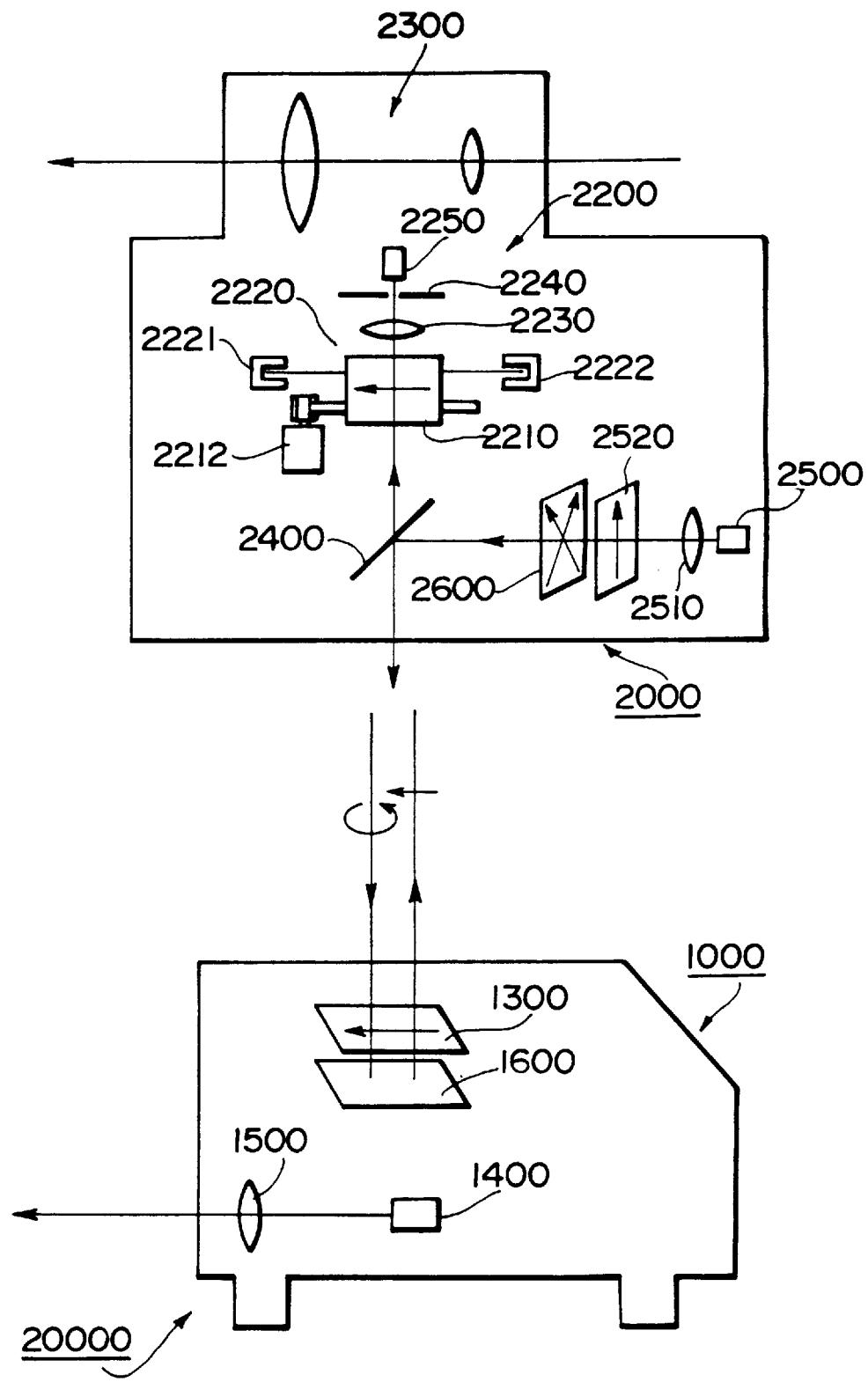
FIG. 7 is a view for describing a second embodiment of the present invention.

A direction finding system 20000 according to a second embodiment will next be described with reference to FIG. 7. The direction finding system 20000 is different from the direction finding system 10000 according to the first embodiment in that a light source is provided within a body 2000 for the direction finding system 20000.

The body 2000 comprises a deflection or direction difference detecting means 2200, a telescope means 2300, a half mirror 2400, a third light source means 2500, a third collimator lens 2510, a polarizing plate 2520 and a ¼-wavelength plate 2600.

In the body 2000, the third light source means 2500, the third collimator lens 2510, a mirror 2720, a polarizing plate 2730 and a ¼-wavelength plate 2800 correspond to a polarized-light radiating means.

A guide light device 1000 comprises a polarizing plate 1300, a mirror 1600, a second laser beam source 1400 and a second collimator lens 1500.

In the guide light device 1000, the polarizing plate 1300 and the mirror 1600 correspond to a polarized-light reflecting means.

The third laser beams source 2500 is of a light source for vertical light. After the laser beam emitted from the third laser beam source 2500 has been collimated by the third collimator lens 2510, the so-processed laser beam is brought into a linearly polarized ray bundle or light beam by the polarizing plate 2730. Further, the light beam passes through the ¼-wavelength plate 2800 so as to fall into circularly polarized light. Thereafter, the polarized light is reflected by the half mirror 2400 so as to be applied downward as the vertical light.

The ¼-wavelength plate can bring the linearly polarized light into the circularly polarized light when the former is caused to enter in a state in which a double refraction axis of the ¼-wavelength plate is inclined 45° to the polarizing direction of the linearly polarized light.

Since the light to be emitted is already the linearly polarized light if the third light source means 2500 is of a semiconductor laser, the polarizing plate 2720 can be omitted.

The circularly polarized light transmitted through the ¼-wavelength plate 2600 passes through the half mirror 2400 so as to be applied vertically and downwardly.

The direction of the downwardly-applied circularly polarized light beam can be adjusted in upward and downward or left and right directions by a suitable adjusting mechanism. In the second embodiment, the irradiation direction is adjusted so that the light beam is accurately applied vertically and downwardly.

The guide light device 1000 receives therein the circularly polarized light beam applied vertically and downwardly from the body 2000 and allows it to pass through the polarizing plate 1300. The polarized light beam transmitted through the polarizing plate 1300 is brought into linearly polarized light defined in the direction of guide light emitted from the guide light device 1000 in a manner similar to the first embodiment. The linearly polarized light is reflected by the mirror 1600 and passes through the polarizing plate 1300 again, followed by application to the body 2000 along the vertical upward direction.

The polarized light beam reflected from the guide light device 1000 passes through the half mirror 2400 of the body 2000 so as to reach the direction difference detecting means 2200.

In the second embodiment constructed as described above, an "angular displacement θ" formed between a collimation direction of the telescope means 2300 and the direction of the guide light emitted from the guide light device 1000 can be computed by the direction difference detecting means 2200 in a manner similar to the first embodiment.

Since the second embodiment is identical in other configuration and function to the first embodiment, their description will be omitted.

The second embodiment can bring about an advantageous effect that since the polarizing plate 1300 and mirror 1600 of the guide light device 1000 are disposed substantially in the vertical upward direction of the circularly polarized light beam and only the reflected light is required, strict alignment is unnecessary.

[Third Embodiment]

Figure 8:
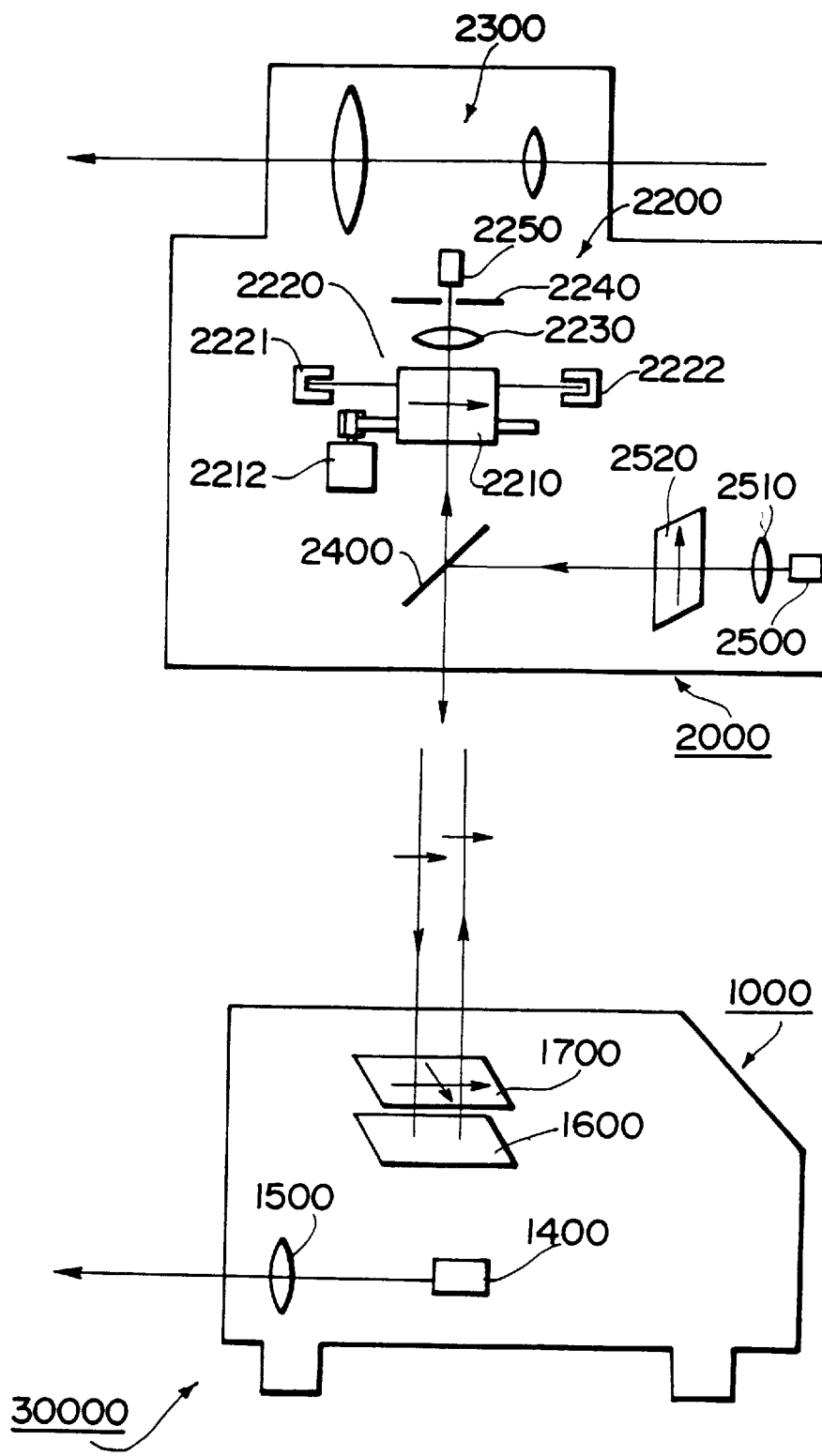
FIG. 8 is a view for explaining a third embodiment of the present invention.

A direction finding system 30000 according to a third embodiment will next be described with reference to FIG. 8. The direction finding system 30000 according to the third embodiment is different from the direction finding system 20000 according to the second embodiment in that a polarized light beam applied vertically and downwardly from a body 2000 for the direction finding system 30000 is linearly polarized light.

The body 2000 comprises a direction difference detecting means 2200, a telescope means 2300, a half mirror 2400, a third light source means 2500, a third collimator lens 2510 and a polarizing plate 2520.

In the body 2000, the third light source means 2500, the third collimator lens 2510 and the polarizing plate 2520 correspond to a polarized light radiating means.

A guide light device 1000 comprises a polarizing plate 1700, a mirror 1600, a second laser beam source 1400 and a second collimator lens 1500.

In the guide light device 1000, the polarizing plate 1700 and the mirror 1600 correspond to a polarized light reflecting means.

The polarizing plate 1700 employed in the third embodiment is of a ½-wavelength polarizing plate. In the ½-wavelength polarizing plate, the polarization plane thereof for the linearly polarized light can be rotated and the difference between angles in polarizing directions of incident light and exit light can be set to twice the angle formed between the polarizing direction of the incident light and a double refraction axis of a double refraction member. In other words, an "angle $\theta$ corresponding to a displacement, i.e., an angular displacement" between a collimation direction of the telescope means 2300 and the direction of guide light emitted from the guide light device 1000 can be doubled.

The third laser beam source 2500 is of a light source for vertical light. After a laser beam emitted from the third laser beam source 2500 has been collimated by the third collimator lens 2510, the collimated laser beam is brought into a linearly polarized light beam by the polarizing plate 2520. Further, the light beam is reflected by the half mirror 2400 so as to be applied downward as the vertical light. It is necessary to match the polarizing direction of the polarizing plate 2520 with the collimation direction of the telescope means 2300.

The linearly polarized light beam transmitted through the polarizing plate 2520 is reflected by the half mirror 2400 so as to be applied in the vertical downward direction.

The guide light device 1000 receives therein the linearly polarized light beam applied vertically and downwardly from the body 2000 and allows it to pass through the polarizing plate 1700. Since the polarizing plate 1700 is of the ¼-wavelength polarizing plate, "the angular displacement $\theta$" between the collimation direction of the telescope means 2300 and the direction of the guide light emitted from the guide light device 1000 can be enlarged twice.

The linearly polarized light beam transmitted through the polarizing plate 1700 is reflected by the mirror 1600. After the light beam has passed through the polarizing plate 1700 again, it is vertically and upwardly emitted toward the body 2000.

The half mirror 2400 of the body 2000 introduces the polarized light beam reflected from the guide light device 1000 into the direction difference detecting means 2200.

In the third embodiment constructed as described above, the direction difference detecting means 2200 can compute the "angular displacement $\theta$" between the collimation direction of the telescope means 2300 and the direction of the guide light of the laser guide device 1000 at a double error angle in the same manner as the second embodiment. Here the third embodiment differs from the second embodiment in that $\theta = \phi/4$.

Further, the third embodiment can bring about an advantageous effect that even if the light is refracted by a magnetic field, the influence of the magnetic field can be canceled by the polarizing plate 1700 corresponding to the ¼-wavelength polarizing plate. A corner cube may be used as an alternative to the mirror 1600.

Since the third embodiment is identical in other configuration and function to the second embodiment, their description will be omitted.

[Fourth Embodiment]

Figure 9:
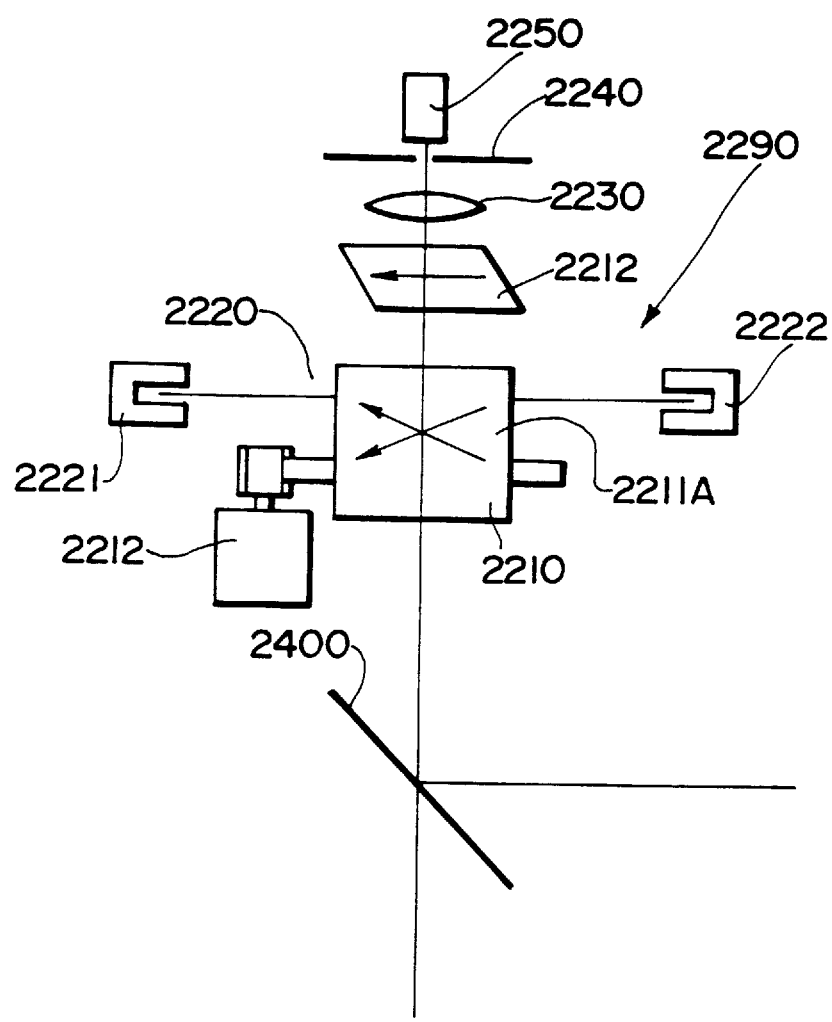
FIG. 9 is a view for explaining a fourth embodiment of the present invention.

A deflection or direction difference detecting means 2290 according to a fourth embodiment will next be described with reference to FIG. 9. The direction difference detecting means 2290 according to the fourth embodiment is equivalent to one wherein a rotatory ½-wavelength polarizing plate 2211A is used as an alternative to the rotatory polarizing plate 2211 of the rotatory polarizing portion 2210.

The direction difference detecting means 2290 comprises a rotatory polarizing portion 2210, an encoder 2220, a polarizing plate 2212, a condenser lens 2230, a diaphragm or stop 2240 and a light-receiving portion 2250.

The rotatory ½-wavelength polarizing plate 2211A is used in place of the rotatory polarizing plate 2211 of the rotatory polarizing portion 2210 and the polarizing plate 2212 is additionally provided.

Since the ½-wavelength polarizing plate is used as the rotatory polarizing portion 2211, the difference between angles in polarizing directions of incident light and exit light can be set twice and hence the rotation of the rotatory polarizing portion 2210 is equivalent to twice. Therefore, the frequency of the resultant sine wave can be doubled. It is thus possible to improve the accuracy of measuring the phase of the waveform.

Incidentally, a polarizing direction of the polarizing plate 2212 needs to have a specific bearing on a collimation direction of a telescope means 2300.

Further, an address counter 600 is of a base N/4 number counter.

The fourth embodiment can be applied to the first through third embodiments.

Further, since the fourth embodiment is identical in other configuration and function to the first through third embodiments, their description will be omitted.

Although the collimation direction of the telescope means 2300 is set as the horizontal direction in the respective embodiments, it may be set as the vertical direction.

The present invention may be configured as a direction finding system wherein the collimation direction of the telescope means 2300 is caused to coincide with the direction of the guide light emitted from the guide light device 1000. Alternatively, the present invention may be configured as a system for measuring the "angular displacement $\theta$" between the collimation direction of the telescope means 2300 and the direction of the guide light emitted from the guide light device 1000.

Further, the present invention can be applied to a pipe laser for setting a predetermined direction or to the alignment of pillars employed in a building site with each other.

In particular, a laser beam emitted from the pipe laser can be used as guide light for installation working of sewer pipes, Hume pipes, etc. The guide light can be adjusted to the left and right directions and also inclined in the vertical direction.

Figure 10:
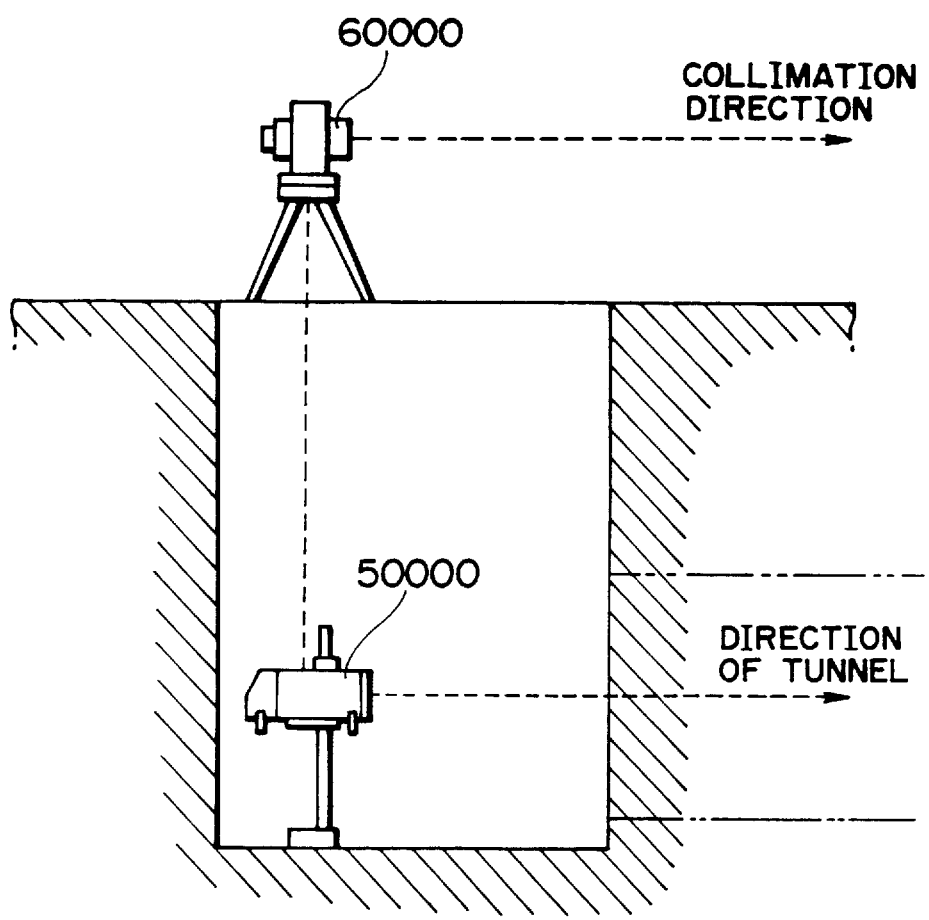
FIG. 10 is a view for describing a use example of the present invention.
Figure 11:
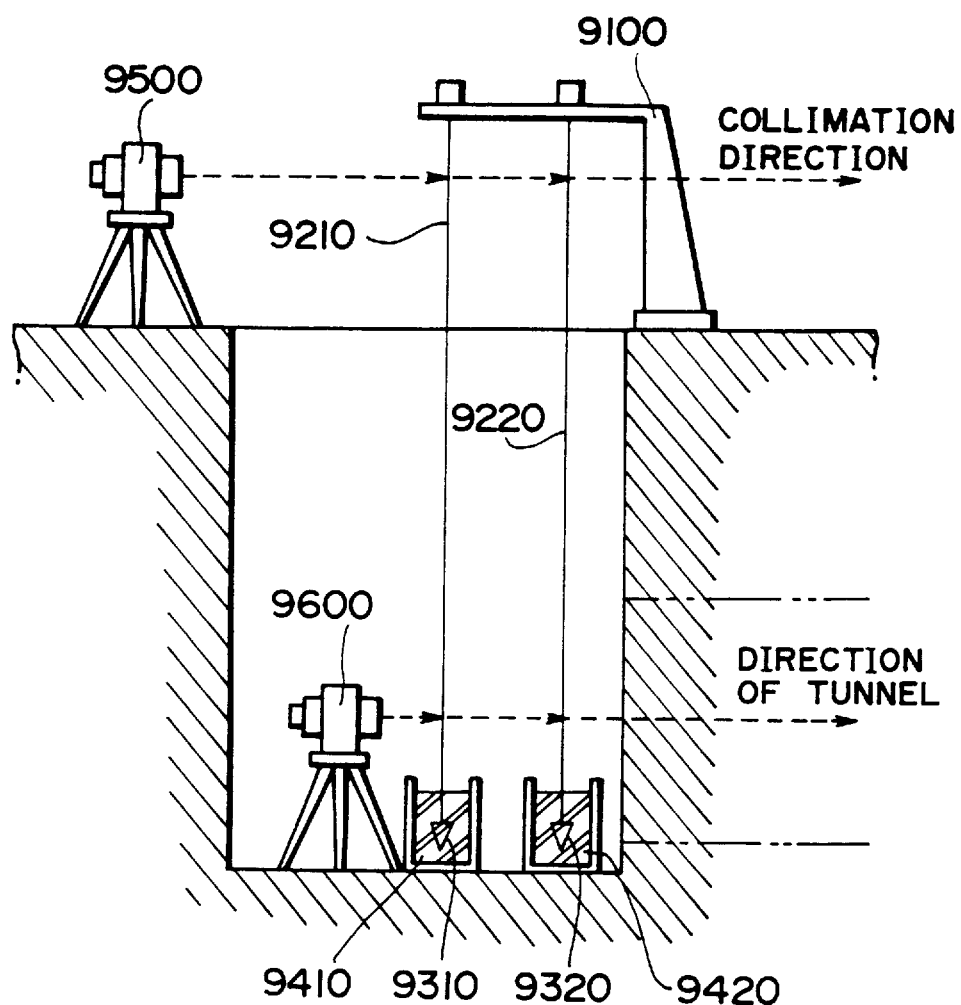
FIG. 11 is a view for describing a prior art.

FIG. 10 shows an embodiment in which a pipe laser 50000 is installed in a tunnel. In the present embodiment, a direction finding system is incorporated into a ground transit 60000. A pipe can be positioned within the tunnel according to the collimation direction of the transit 60000.

A polarized light radiating means provided in a guide light means irradiates a body for a direction finding system with a polarized light beam defined in a predetermined direction. A direction difference detecting means provided in the body receives therein the polarized light beam emitted from the polarized light radiating means and detects the difference between the direction of the polarized light beam and the predetermined direction. A rotatory polarizing plate of the direction difference detecting means allows the polarized light beam to pass therethrough. A condenser lens gathers the polarized light beam transmitted through the rotatory polarizing plate. A light-receiving portion receives therein the polarized light beam focused by the condenser lens. Further, an encoder means detects a predetermined position and rotation of the rotatory polarizing plate. Therefore, the present invention constructed as described above can bring about an advantageous effect that high-precision positioning can be achieved without the need for a large-scaled device and storage of accumulated errors and the diameter of a vertical shaft or the like can be reduced.

According to the present invention as well, an A/D converting means A/D-converts signals corresponding to the light beam received by the light-receiving portion into digital signals. A storing means superimposes the A/D-converted digital signals on one another every periods and stores the same therein. A computing or arithmetic means averages the signals stored in the storing means. Thus, the difference between phases in the polarizing direction of the rotatory polarizing plate and the direction of the polarized light beam applied from the guide light means is computed.

A rotatable polarizing direction changing member for observing the polarizing direction of the polarized light beam applied from the polarized light radiating means as a waveform can be also used in the direction difference detecting means of the body as an alternative to the rotatory polarizing plate.

Further, according to the present invention, a polarized light reflecting means of a guide light means reflects a polarized light beam. A polarized light radiating means of a body for a direction finding system applies the polarized light beam to the polarized light reflecting means. A direction difference detecting means of the body receives therein the polarized light beam reflected by the polarized light reflecting means and detects the difference between the direction of the polarized light beam and a predetermined direction. A rotatory polarizing plate of the direction difference detecting means causes the polarized light beam to pass therethrough. A condenser lens gathers the polarized light beam transmitted through the rotatory polarizing plate. A light-receiving portion receives therein the polarized light beam focused by the condenser lens. Further, an encoder means detects a predetermined position and rotation of the rotatory polarizing plate.

Furthermore, according to the present invention, an A/D converting means A/D-converts signals corresponding to the light beam received by the light-receiving portion into digital signals. A storing means superimposes the A/D-converted digital signals on one another every periods and stores the same therein. A computing means averages the signals stored in the storing means. Thus, the difference between phases in the polarizing direction of the rotatory polarizing plate and the direction of the polarized light beam applied from the guide light means is computed.

A rotatable polarizing direction changing member for observing the polarizing direction of the polarized light beam reflected from the guide light means as a waveform can be also used in the direction difference detecting means of the body as an alternative to the rotatory polarizing plate.

In the present invention, the polarized light beam applied from the polarized light radiating means can be replaced by circularly polarized light.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A direction finding system comprising:

guide light means for applying guide light; and a body of said direction finding system, said body being formed separately from said guide light means and adapted to detect a polarized light beam emitted from said guide light means;

said guide light means including polarized light radiating means for radiating said body with the polarized light beam defined in a predetermined direction;

said body including direction difference detecting means for receiving therein a polarized light beam emitted from said polarized light radiating means and detecting a difference between the direction of the polarized light beam and the predetermined direction, said direction difference detecting means comprising:

a rotatory polarizing plate for allowing the polarized light beam to pass therethrough;

a condenser lens for gathering the polarized light beam transmitted through said rotatory polarizing plate;

a light-receiving portion for receiving therein the polarized light beam gathered by said condenser lens;

encoder means for detecting a predetermined position and rotation of said rotatory polarizing plate;

A/D converting means for performing A/D conversion on signals corresponding to the light beam received by said light-receiving portion;

storing means for superimposing the digital signals A/D-converted by said A/D converting means on one another every period and storing the same therein; and computing means for averaging the signals stored in said storing means thereby to compute a difference between phases in the polarizing direction of said rotatory polarizing plate and the direction of the polarized light beam applied from said guide light means.

2. A direction finding system comprising:

guide light means for applying guide light; and a body of said direction finding system, said body being formed separately from said guide light means and adapted to detect a polarized light beam emitted from said guide light means;

said guide light means including polarized light reflecting means for reflecting the polarized light beam;

said body including polarized light radiating means for radiating said polarized light reflecting means with the polarized light beam and direction difference detecting means for receiving therein the polarized light beam reflected by said polarized light reflecting means and detecting a difference between the direction of the polarized light beam and a predetermined direction, said direction difference detecting means comprising:

a rotatory polarizing plate for causing the polarized light beam to pass therethrough;

a condenser lens for gathering the polarized light beam transmitted through said rotatory polarizing plate;

a light-receiving portion for receiving therein the polarized light beam gathered by said condenser lens; and encoder means for detecting a predetermined position and rotation of said rotatory polarizing plate.

3. A direction finding system comprising:

guide light means for applying guide light; and a body of said direction finding system, said body being formed separately from said guide light means and adapted to detect a polarized light beam emitted from said guide light means;

said guide light means including polarized light reflecting means for reflecting the polarized light beam;

said body including polarized light radiating means for radiating said polarized light reflecting means with the polarized light beam and direction difference detecting means for receiving therein the polarized light beam reflected by said polarized light reflecting means and detecting a difference between the direction of the polarized light beam and a predetermined direction, said direction difference detecting means comprising:

A/D converting means for performing A/D conversion on signals corresponding to the light beam received by said light-receiving portion;

storing means for superimposing the digital signals A/D-converted by said A/D converting means on one another every periods and storing the same therein; and computing means for averaging the signals stored in said storing means thereby to compute a difference between phases in the polarizing direction of said rotatory polarizing plate and the direction of the polarized light beam applied from said guide light means.

4. A direction finding system according to claims 2 or 3, wherein a rotatable polarizing direction changing member for observing the polarizing direction of the polarized light beam reflected from said guide light means as a waveform is used in said direction difference detecting means of said body as an alternative to said rotatory polarizing plate.

5. A direction finding system according to claims 3 or 4, wherein the polarized light beam applied from said polarized light radiating means is circularly polarized light.

6. A direction finding system comprising:

guide light means for applying guide light; and a body being formed separately from said guide light means and adapted to detect a polarized light beam emitted from said guide light means;

said guide light means including polarized light radiating means for radiating said body with the polarized light beam defined in a predetermined direction;

said body including direction difference detecting means for receiving therein a polarized light beam emitted from said polarized light radiating means and detecting a difference between the direction of the polarized light beam and the predetermined direction, said direction difference detecting means comprising:

a rotatable polarizing direction changing member for observing the polarizing direction of the polarized light beam applied from said polarized light radiating means as a waveform;

a condenser lens for gathering the polarized light beam transmitted through said rotatable polarizing direction changing member;

a light-receiving portion for receiving therein the polarized light beam gathered by said condenser lens;

encore means for detecting a predetermined position and rotation of said rotatable polarizing direction changing member;

A/D converting means for performing A/D conversion on signals corresponding to the light beam received by said light-receiving portion;

storing means for superimposing the digital signals A/D-converted by said A/D converting means on one another every period and storing the same therein; and computing means for averaging the signals stored in said storing means thereby to compute a difference between, phases in the polarizing direction of said rotatable polarizing direction changing member and the direction of the polarized light beam applied from said guide light means.

* * * * *